(12) United States Patent
Agrawal et al.

(10) Patent No.: US 12,309,524 B2
(45) Date of Patent: May 20, 2025

(54) CAPTURING SELF-PHOTO IMAGES USING A MULTI-CAMERA ELECTRONIC DEVICE

(71) Applicant: MOTOROLA MOBILITY LLC, Wilmington, DE (US)

(72) Inventors: Amit Kumar Agrawal, Bangalore (IN); Rahul Bharat Desai, Hoffman Estates, IL (US)

(73) Assignee: Motorola Mobility LLC, Chicago, IL (US)

( * ) Notice: Subject to any disclaimer, the term of this patent is extended or adjusted under 35 U.S.C. 154(b) by 173 days.

(21) Appl. No.: 18/340,697

(22) Filed: Jun. 23, 2023

(65) Prior Publication Data

US 2024/0430378 A1 Dec. 26, 2024

(51) Int. Cl.
| | | |
|---|---|---|
| *H04N 5/272* | (2006.01) | |
| *G06T 7/194* | (2017.01) | |
| *H04N 5/262* | (2006.01) | |
| *H04N 23/63* | (2023.01) | |
| *H04N 23/667* | (2023.01) | |
| *H04N 23/90* | (2023.01) | |

(52) U.S. Cl.
CPC ............. *H04N 5/272* (2013.01); *G06T 7/194* (2017.01); *H04N 5/2628* (2013.01); *H04N 23/632* (2023.01); *H04N 23/634* (2023.01); *H04N 23/667* (2023.01); *H04N 23/90* (2023.01); *G06T 2207/20132* (2013.01); *G06T 2207/20212* (2013.01); *G06T 2207/30201* (2013.01)

(58) Field of Classification Search
CPC .... H04N 5/272; H04N 5/2628; H04N 23/632; H04N 23/634; H04N 23/667; H04N 23/90; H04N 23/45; H04N 23/61; H04N 23/611; H04N 23/635; H04N 23/64; G06T 7/194; G06T 2207/20132; G06T 2207/20212; G06T 2207/30201; G06T 5/50; G06T 2207/20221
See application file for complete search history.

(56) References Cited

U.S. PATENT DOCUMENTS

| | | | | |
|---|---|---|---|---|
| 10,582,119 | B2 * | 3/2020 | Hegde | ............ H04N 5/272 |
| 11,012,639 | B2 * | 5/2021 | Kim | ............ H04N 5/272 |
| 11,574,392 | B2 * | 2/2023 | Lin | ............ G06F 18/24 |
| 2010/0124941 | A1 * | 5/2010 | Cho | ............ H04M 1/72427 |
| | | | | 345/173 |
| 2012/0120273 | A1 * | 5/2012 | Amagai | ............ H04N 23/90 |
| | | | | 348/222.1 |

(Continued)

*Primary Examiner* — Chiawei Chen
(74) *Attorney, Agent, or Firm* — Isidore PLLC

(57) ABSTRACT

An electronic device, a method and a computer program product for controlling multiple cameras. The method includes detecting, via at least one processor, activation of a first camera of an electronic device to capture a first image incorporating a first region of interest within a field of view of the first camera and in response to detecting selection of a dual camera superimposed selfie capture mode for completing the image capture, capturing, via the first camera, the first image that includes the first region of interest. The method further includes contemporaneously capturing, via a second camera, a second image containing at least one face, cropping a facial image comprising the at least one face from the second image and superimposing the facial image onto the first image to generate a first composite image.

20 Claims, 12 Drawing Sheets

(56) References Cited

U.S. PATENT DOCUMENTS

| | | | |
|---|---|---|---|
| 2013/0235224 A1* | 9/2013 | Park | H04N 23/64 |
| | | | 348/E5.024 |
| 2018/0077359 A1* | 3/2018 | Ye | H04N 1/3876 |
| 2019/0215467 A1* | 7/2019 | Kim | H04N 5/272 |
| 2024/0412432 A1* | 12/2024 | Chung | G06T 11/001 |

* cited by examiner

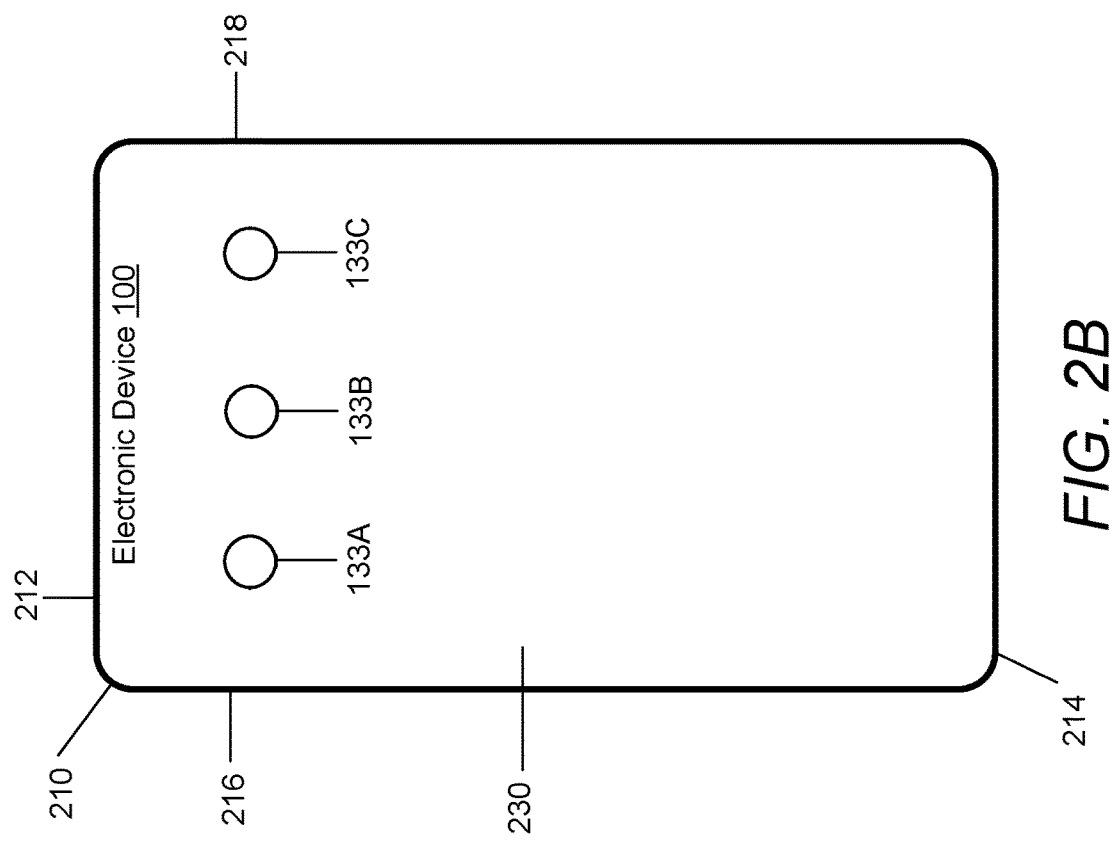
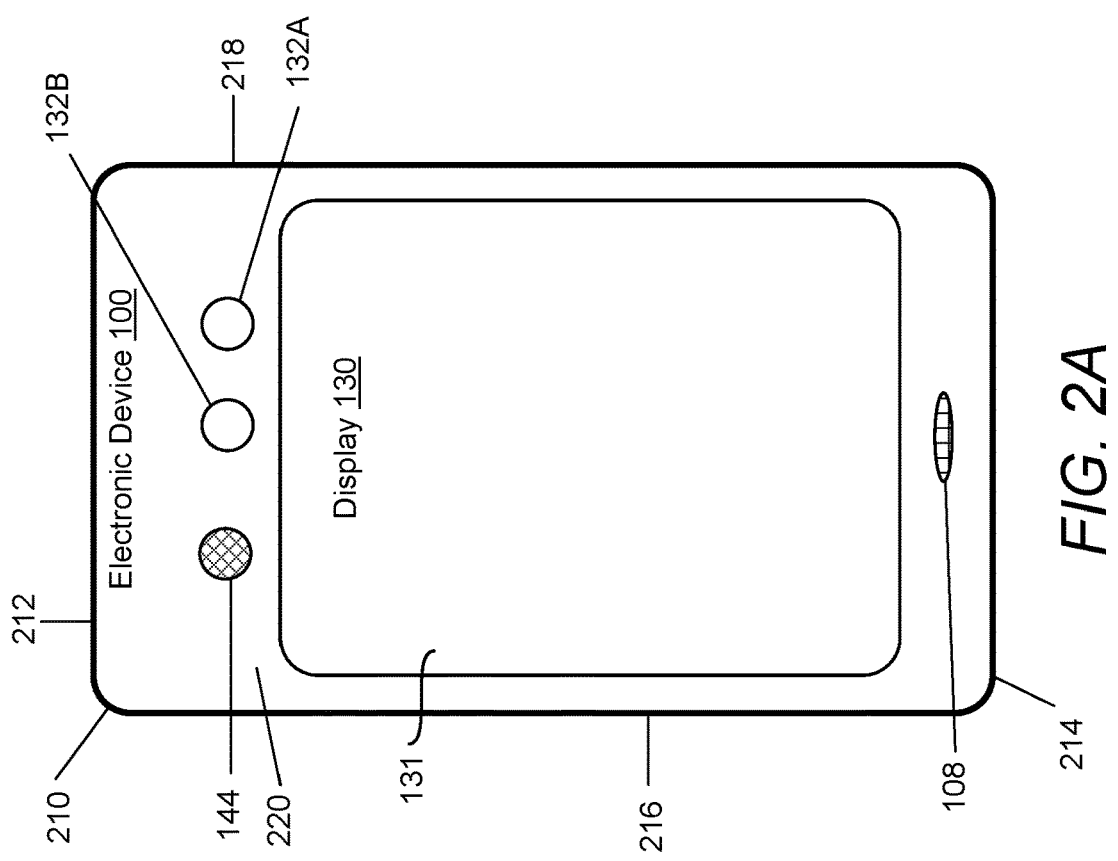
FIG. 2B
FIG. 2A

CAPTURING SELF-PHOTO IMAGES USING A MULTI-CAMERA ELECTRONIC DEVICE

BACKGROUND

1. Technical Field

The present disclosure generally relates to electronic devices with multiple cameras and in particular to capturing images using an electronic device with multiple cameras.

2. Description of the Related Art

Electronic devices, such as cell phones, tablets, and laptops, are widely used for communication and data transmission. These electronic devices typically include one or more cameras that are used for taking pictures and videos. Many conventional electronic devices have multiple front and rear cameras. The rear cameras can have lenses that are optimized for various focal angles and distances. For example, one rear camera can have a wide angle lens, another rear camera can have a telephoto lens, and an additional rear camera can have a macro lens. It is common for electronic device users to take photos of themselves, which are colloquially referred to as a selfie or self-photo. A typical front camera can have a larger aperture for better low light performance and a depth of field optimized for taking closer images. The larger aperture of the front camera has a smaller depth of field which results in objects in the background of the photo being out of focus or blurred. When a user takes a selfie with a typical front camera, the face of the user will be in focus and the background and objects in the background will be blurred and out of focus.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 2A is an example illustration of the front of an electronic device with multiple front cameras, according to one or more embodiments;

FIG. 2B is an example illustration of the rear of an electronic device with multiple rear cameras, according to one or more embodiments;

DETAILED DESCRIPTION

Figure 1:
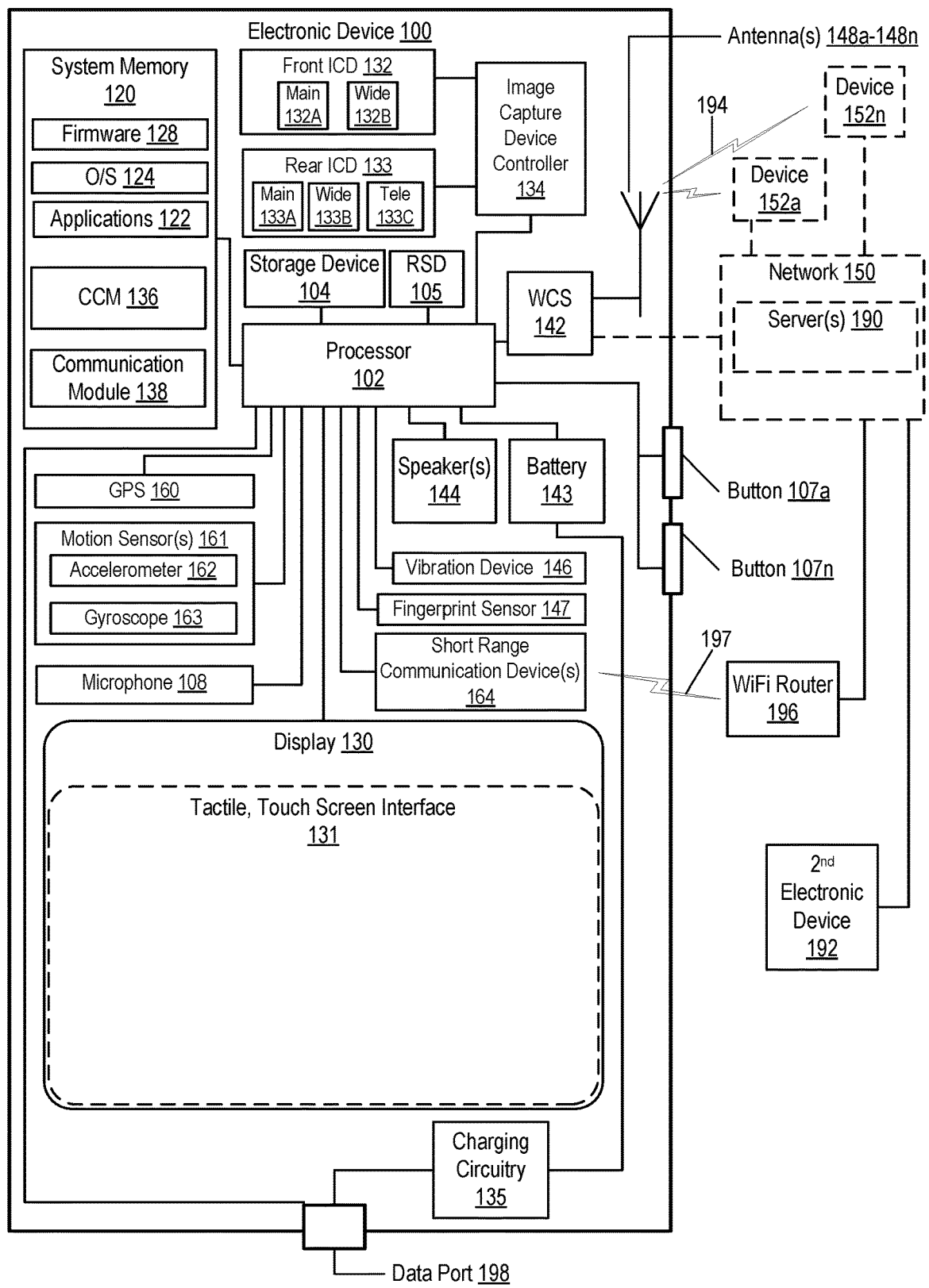
FIG. 1 depicts an example electronic device within which various aspects of the disclosure can be implemented, according to one or more embodiments.

According to one aspect of the disclosure, the illustrative embodiments provide an electronic device, a method, and a computer program product for controlling multiple cameras and generating a composite image from individual images captured by the multiple cameras. In a first embodiment, an electronic device includes a housing having a first surface and a second surface opposed to the first surface. The electronic device also includes at least one display, a first camera disposed at the first surface, and a second camera disposed at the second surface. The electronic device further includes a memory having stored thereon a camera control module (CCM) for controlling image capturing via the first camera and the second camera. The electronic device includes at least one processor communicatively coupled to the at least one display, each of the first camera and the second camera, and to the memory. The at least one processor executes program code of the CCM, which enables the electronic device to detect activation of the first camera to capture a first image incorporating a first region of interest (ROI) within a field of view of the first camera and, in response to detecting selection of a dual camera superimposed selfie capture (DCSSC) mode for completing the image capture, the at least one processor captures, via the first camera, the first image that includes the first region of interest and contemporaneously captures, via the second camera, a second image containing at least one face. The at least one processor crops a facial image comprising the at least one face from the second image and superimposes the facial image onto the first image to generate a first composite image.

According to another embodiment, the method includes detecting, via at least one processor, activation of a first camera of an electronic device to capture a first image incorporating a first region of interest (ROI) within a field of view of the first camera. In response to detecting selection of a dual camera superimposed selfie capture (DCSSC) mode for completing the image capture, the method includes capturing, via the first camera, the first image that includes the first region of interest and contemporaneously capturing, via a second camera, a second image containing at least one face. The method further includes cropping a facial image comprising the at least one face from the second image and superimposing the facial image onto the first image to generate a first composite image.

According to an additional embodiment, a computer program product includes a computer readable storage device having stored thereon program code that, when executed by at least one processor of an electronic device having a housing with a first surface and a second surface opposed to the first surface, at least one display, a first camera disposed at the first surface, and a second camera disposed at the second surface, the program code enables the electronic device to complete the functionality of one or more of the above described method.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within electronic device 100 (FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 depicts an example electronic device 100 within which various aspects of the disclosure can be implemented, according to one or more embodiments. Examples of such electronic devices include, but are not limited to, mobile devices, a notebook computer, a mobile phone, a digital camera, a smart watch, a tablet computer and a communication device, etc. It is appreciated that electronic device 100 can be other types of devices that include both at least one front camera and/or multiple rear camera(s). Electronic device 100 includes processor 102, which is communicatively coupled to storage device 104, system memory 120, input devices, (introduced below), output devices, such as display 130, and image capture device (ICD) controller 134. Processor 102 can include processor resources such as a central processing unit (CPU) that support computing, classifying, processing and transmitting of data and information. Processor 102 can further include graphic processing units (GPU) and digital signal processors (DSP) that also support computing, classifying, processing and transmitting of data and information.

According to one or more embodiments, ICD controller 134 performs or supports functions such as, but not limited to, operating multiple cameras, adjusting camera settings and characteristics (shutter speed, f/stop, ISO exposure, zoom control, etc.) of the multiple cameras, etc. ICD controller 134 can perform these functions in response to commands received from processor 102, which is executing camera control module (CCM) 136. In one or more embodiments, the functionality of ICD controller 134 is incorporated within processor 102, eliminating the need for a separate ICD controller. For simplicity in describing the features presented herein, the various camera control functions performed by the ICD controller 134 are described as being provided generally by processor 102.

System memory 120 may be a combination of volatile and non-volatile memory, such as random access memory (RAM) and read-only memory (ROM). System memory 120 can store program code or similar data associated with firmware 128, an operating system 124, applications 122, camera control module (CCM) 136, and communication module 138. CCM 136 includes program code that is executed by processor 102 to enable electronic device 100 to control image capturing via multiple cameras and to combine images to form a composite image when the electronic device is placed in a specific image capturing mode. Communication module 138 includes program code that is executed by processor 102 to enable electronic device 100 to communicate with other external devices and systems.

Although depicted as being separate from applications 122, CCM 136 and communication module 138 may be each implemented as an application. Processor 102 loads and executes program code stored in system memory 120. Examples of program code that may be loaded and executed by processor 102 include program code associated with applications 122 and program code associated with CCM 136 and communication module 138.

In one or more embodiments, electronic device includes removable storage device (RSD) 105, which is inserted into an RSD interface (not shown) that is communicatively coupled via system interlink to processor 102. In one or more embodiments, RSD 105 is a non-transitory computer program product or computer readable storage device. RSD 105 may have a version of CSCM 136 stored thereon, in addition to other program code. Processor 102 can access RSD 105 to provision electronic device 100 with program code that, when executed by processor 102, the program code causes or configures electronic device 100 to provide the functionality described herein.

Display 130 can be one of a wide variety of display screens or devices, such as a liquid crystal display (LCD) and an organic light emitting diode (OLED) display. In some embodiments, display 130 can be a touch screen device that can receive user tactile/touch input. As a touch screen device, display 130 includes a tactile, touch screen interface 131 that allows a user to provide input to or to control electronic device 100 by touching features presented within/below the display screen. Tactile, touch screen interface 131 can be utilized as an input device.

Throughout the disclosure, the term image capturing device is utilized interchangeably to be synonymous with and/or refer to any one of front or rear cameras 132, 133. Front cameras (or image capture device (ICD)) 132 are communicatively coupled to ICD controller 134, which is communicatively coupled to processor 102. ICD controller 134 supports the processing of signals from front cameras 132. Front cameras 132 can each capture images that are within the respective field of view (FOV) of image capture device 132. Electronic device 100 includes several front cameras 132. First front camera 132A is a main camera that captures a standard angle FOV. Second front camera 132B is wide angle camera. Front cameras 132A and 132B can be collectively referred to as front cameras 132A-132B. While two front cameras 132A-132B are shown, electronic device 100 can have more than two front cameras.

Electronic device 100 further includes several rear cameras 133. Main rear camera 133A is a main camera that captures a standard or regular angle FOV. Wide angle rear camera 133B is a wide angle camera that captures a wide angle FOV. Telephoto rear camera 133C is a telephoto camera that captures a telephoto FOV (zoom or magnified). While three rear cameras are shown, electronic device 100 can have less than three rear cameras, such as having two rear cameras or can have more than three rear cameras.

Each front camera 132A and 132B and each rear camera 133A, 133B and 133C is communicatively coupled to ICD controller 134, which is communicatively coupled to processor 102. ICD controller 134 supports the processing of signals from front cameras 132A and 132B and rear cameras 133A, 133B and 133C. Front cameras 132A and 132B can be collectively referred to as front cameras 132, and rear cameras 133A, 133B and 133C can be collectively referred to as rear cameras 133, for simplicity.

Electronic device 100 can further include data port 198, charging circuitry 135, and battery 143. Electronic device 100 further includes microphone 108, one or more output devices such as speakers 144, and one or more input buttons 107a-n. Input buttons 107a-n may provide controls for volume, power, and image capture devices 132, 133. Microphone 108 can also be referred to as audio input device 108. Microphone 108 and input buttons 107a-n can also be referred to generally as input devices.

Electronic device 100 further includes wireless communication subsystem (WCS) 142, which is coupled to antennas 148a-148n. In one or more embodiments, WCS 142 can include a communication module with one or more baseband processors or digital signal processors, one or more modems, and a radio frequency front end having one or more transmitters and one or more receivers. Wireless communication subsystem (WCS) 142 and antennas 148a-148n allow electronic device 100 to communicate wirelessly with wireless network 150 via transmissions of communication signals 194 to and from network communication devices 152a-152n, such as base stations or cellular nodes, of wireless network 150. In one embodiment, communication network devices 152a-152n contain electronic communication equipment to allow communication with electronic device 100.

Wireless network 150 further allows electronic device 100 to wirelessly communicate with second electronic devices 192, which can be similarly connected to wireless network 150 via one of network communication devices 152a-152n. Wireless network 150 is communicatively coupled to wireless fidelity (WiFi) router 196. Electronic device 100 can also communicate wirelessly with wireless network 150 via communication signals 197 transmitted by short range communication device(s) 164 to and from WiFi router 196, which is communicatively connected to network 150. In one or more embodiment, wireless network 150 can include one or more servers 190 that support exchange of wireless data and video and other communication between electronic device 100 and second electronic device 192.

Electronic device 100 further includes short range communication device(s) 164. Short range communication device 164 is a low powered transceiver that can wirelessly communicate with other devices. Short range communication device(s) 164 can include one or more of a variety of devices, such as a near field communication (NFC) device, a Bluetooth device, and/or a wireless fidelity (Wi-Fi) device. Short range communication device(s) 164 can wirelessly communicate with WiFi router 196 via communication signals 197. In one embodiment, electronic device 100 can receive internet or Wi-Fi based calls via short range communication device(s) 164. In one embodiment, electronic device 100 can communicate with WiFi router 196 wirelessly via short range communication device(s) 164. In an embodiment, WCS 142, antennas 148a-148n and short-range communication device(s) 164 collectively provide communication interface(s) of electronic device 100. These communication interfaces enable electronic device 100 to communicatively connect to at least one second electronic device 192 via at least one network.

Electronic device 100 further includes vibration device 146, fingerprint sensor 147, global positioning system (GPS) device 160, and motion sensor(s) 161. Vibration device 146 can cause electronic device 100 to vibrate or shake when activated. Vibration device 146 can be activated during an incoming call or message in order to provide an alert or notification to a user of electronic device 100. According to one aspect of the disclosure, display 130, speakers 144, and vibration device 146 can generally and collectively be referred to as output devices.

Fingerprint sensor 147 can be used to provide biometric data to identify or authenticate a user. GPS device 160 can provide time data and location data about the physical location of electronic device 100 using geospatial input received from GPS satellites. In one embodiment, the time data and location data can be utilized by processor 102 in determining a current context of a communication.

Motion sensor(s) 161 can include one or more accelerometers 162 and gyroscope 163. Motion sensor(s) 161 can detect movement of electronic device 100 and provide motion data to processor 102 indicating the spatial orientation and movement of electronic device 100. Accelerometers 162 measure linear acceleration of movement of electronic device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of electronic device 100.

In the description of each of the following figures, reference is also made to specific components illustrated within the preceding figure(s). Similar components are presented with the same reference number.

Turning to FIG. 2A, additional details of the front surface of electronic device 100 are shown. Electronic device 100 includes a housing 210 that contains the components of electronic device 100. Housing 210 includes a top 212, bottom 214, and opposed sides 216 and 218. Housing 210 further includes a front surface 220. Microphone 108, display 130, front cameras 132A, 132B and speaker 144 are located on/at front surface 220.

With additional reference to FIG. 2B, additional details of the rear surface of electronic device 100 are shown. Housing 210 further includes a rear surface 230. Various components of electronic device 100 are located on/at rear surface 230, including rear cameras 133. Rear main camera 133A, rear wide angle camera 133B, and rear telephoto camera 133C are illustrated located on rear surface 230. Each of the multiple rear facing cameras can have different image capturing characteristics. For example, rear facing telephoto camera 133C can include an optical zoom lens that is optimized for capturing images of distant objects.

Figure 3:
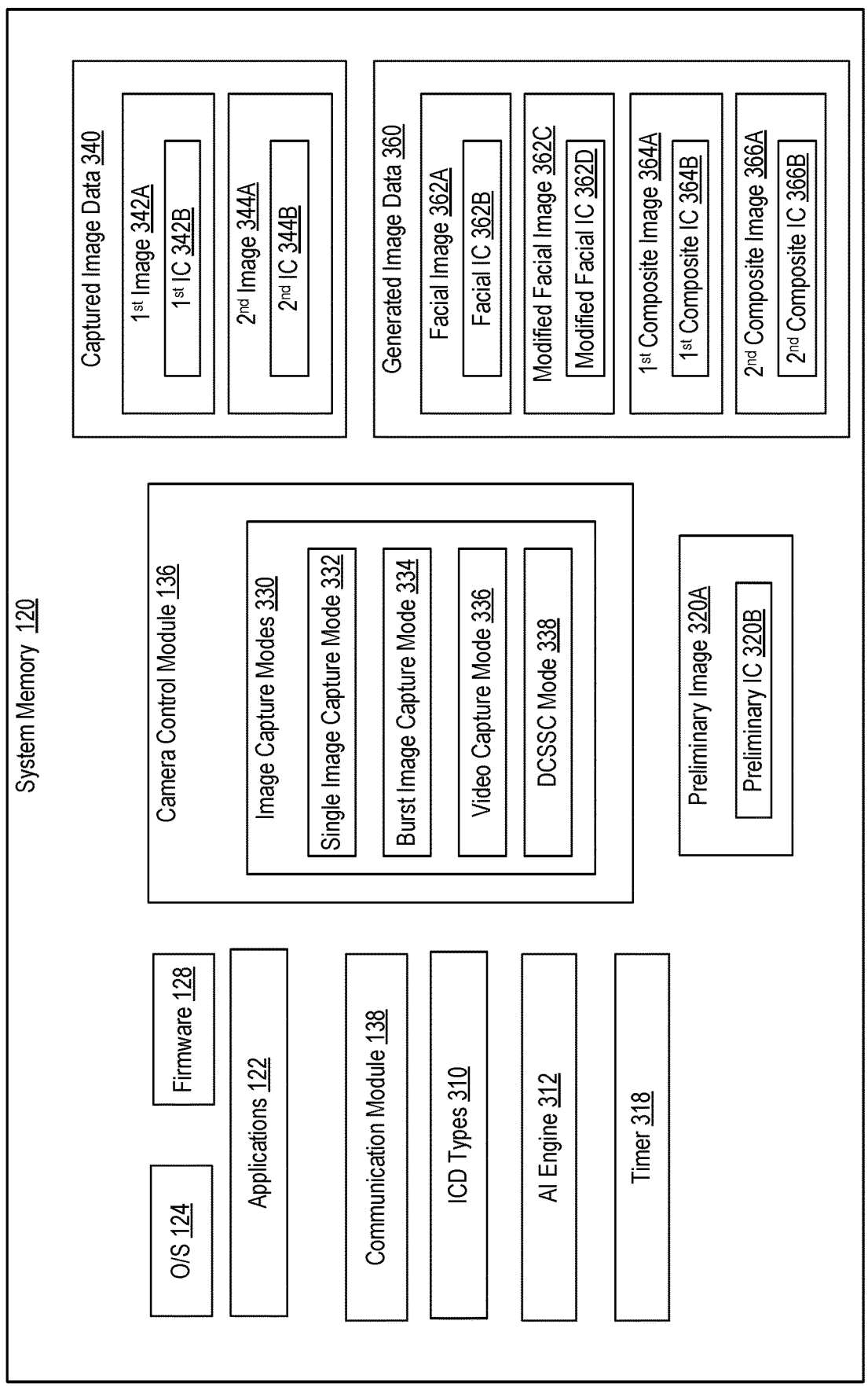
FIG. 3 is a block diagram of example contents of the system memory of the example electronic device of FIG. 1, according to one or more embodiments.

Referring to FIG. 3, there is shown one embodiment of example contents of system memory 120 of electronic device 100. System memory 120 includes data, software, and/or firmware modules, including applications 122, operating system 124, firmware 128, CCM 136, and communication module 138.

CCM 136 includes program code that is executed by processor 102 to enable electronic device 100 to perform the various features of the present disclosure. In one or more embodiments, CCM 136 enables electronic device 100 to control multiple cameras and to generate a composite image from images captured by the multiple cameras in response to the device 100 being placed in a specific image capturing mode. In one or more embodiments, execution of CCM 136 by processor 102 enables/configures electronic device 100 to perform the processes presented in the flowcharts of FIGS. 8-10, as will be described below.

CCM 136 further includes image capture modes 330. Image capture modes 330 are modes of operation that can be used with each of the front cameras 132A-133B and rear cameras 133A-133C. The examples presented of image capture modes 330 comprise single image capture mode 332, burst image capture mode 334, video capture mode 336, and dual camera superimposed selfie capture (DCSSC) mode 338.

In one embodiment, a user can select one of the front cameras 132A-133B or rear cameras 133A-133C as the active camera and then can select one of the image capture modes for use with the selected camera. Single image capture mode 332 enables electronic device 100 to capture a single image. In one or more embodiments, single image capture mode 332 is a default mode setting for the image capture. Burst image capture mode 334 enables electronic device 100 to capture a sequential series of images. For example, electronic device 100 can capture an image every half a second for 5 seconds for a total of 10 captured images. Video capture mode 336 enables electronic device 100 to capture video data using the selected active camera.

DCSSC mode 338 enables electronic device 100 to capture two or more images and generate a composite image using at least one of front cameras 132A-133B and at least one of rear cameras 133A-133C. DCSSC mode 338 enables electronic device 100 to capture a first image using at least one of rear cameras 133A-133C and contemporaneously capture, via at least one of the front cameras 132A-133B, a second image containing at least one face. DCSSC mode 338 further enables electronic device 100 to crop a facial image comprising the at least one face from the second image and superimpose the facial image onto the first image to generate a first composite image. It is appreciated that other types of modes can be defined for use by the electronic device 100, and that those additional modes fall within the scope of the disclosure.

Communication module 138 enables electronic device 100 to communicate with wireless network 150 and with other devices, such as second electronic device 192, via one or more of audio, text, and video communications.

System memory 120 further includes camera or ICD types 310, and artificial intelligence (AI) engine 312. ICD types 310 contains information identifying the specific front and rear cameras 132A, 132B, 133A, 133B and 133C that are included in electronic device 100 and settings/parameters of each camera.

AI engine 312 enables electronic device 100 to identify a face and a background in an image and to remove the background from the image to generate a facial image based on the remaining face after the background has been removed. In one embodiment, AI engine 312 can use segmentation technology to divide an image into multiple segments that each represents a specific object or area of interest. AI engine 312 can analyze the segments to locate one or more faces and generate a facial image.

System memory 120 further includes preliminary image 320A, captured image data 340 and generated image data 360. Preliminary image 320A is an image that is automatically captured by one or more cameras of electronic device 100 after at least one camera has been selected for use or after one of the image capture modes 330 has been selected. Electronic device 100 can use preliminary image 320A to determine various preliminary image characteristics 320B of the image content. In one example embodiment, electronic device 100 can perform facial and scene recognition on preliminary image 320A to provide a description of the contents of preliminary image 320A. In another example embodiment, electronic device 100 can determine if a background of preliminary image 320A is in or out of focus and store that information in preliminary image characteristics 320B of system memory 120.

Captured image data 340 are images captured by at least one of front facing cameras 132A-132B and/or at least one of rear cameras 133A-133C. Example image data 340 includes one or more images, such as first image 342A and second image 344A. First image 342A incudes first image characteristics (IC) 342B. Second image 344A incudes second IC 344B. IC 342B and 344B are attributes identified as associated with each of their respective images and can be used to adjust subsequently rendered or generated images. For example, IC 342B and 344B can include light levels, light direction, exposure, white balance, focal distances, distances to objects, and directions to objects.

Generated image data 360 includes images that are generated by electronic device 100 based on captured image data 340. Example generated image data 360 includes one or more images such as facial image 362A, modified facial image 362C, first composite image 364A, and second composite image 366A. Facial image 362A incudes facial IC 362B. Modified facial image 362C incudes modified facial IC 362D. First composite image 364A incudes first composite IC 364B. Second composite image 366A incudes second composite IC 366B.

System memory 120 further includes timer 318. In one embodiment, a user can select a position/size icon to re-position and/or re-size modified facial image 362C within first composite image 364A. Timer 318 tracks a time period for the user to select the position/size icon.

Figure 4A:
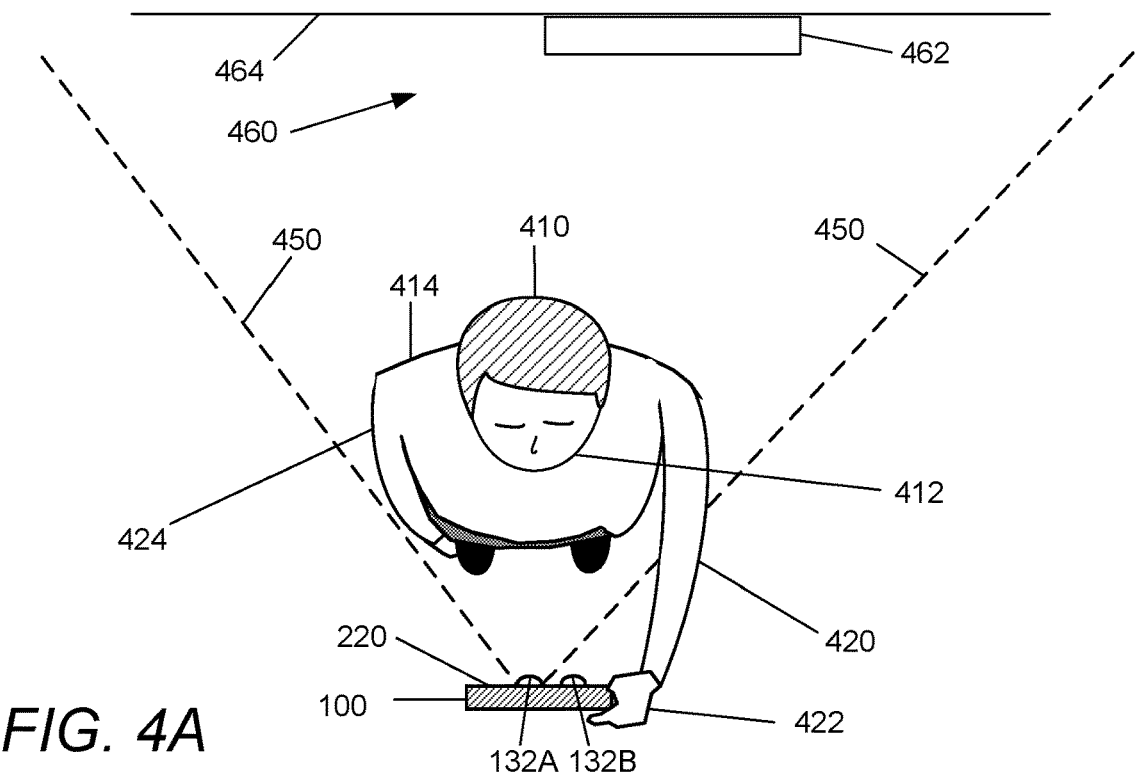
FIG. 4A is an example top view illustration of a camera of an electronic device being positioned to take a self-photo, according to one or more embodiments.

Referring to FIG. 4A, electronic device 100 is shown positioned to capture an image, such as a self-photo or selfie, of an electronic device user 410 along with a background region of interest (ROI) 460 that includes a painting 462 on a wall 464. In an example embodiment, electronic device user 410 can be in a museum and desire to take a selfie of themselves with painting 462. Electronic device user 410 can hold electronic device 100, out in front in a position facing electronic device user 410, using left arm 420 and left hand 422. Left hand 422 can grasp, hold and manipulate electronic device 100. Electronic device user 410 further has a face 412, a torso 414, and a right arm 424.

In FIG. 4A, electronic device 100 is shown with front surface 220 facing electronic device user 410. Front camera 132A is oriented facing electronic device user 410. Front camera 132A captures images within a regular angle field of view (FOV) 450. In the example embodiment of FIG. 4A, front camera 132A has been activated in an image capturing mode (e.g., single image capture mode 332) by user selection via touch screen interface 131. In one embodiment, electronic device 100 can be positioned such that the face 412 and at least a portion of torso 414 of electronic device user 410 are within FOV 450. Electronic device 100 can further be positioned such that background ROI 460 including painting 462 is within FOV 450.

According to one aspect of the disclosure, after the single image capture mode 332 has been activated for front camera 132A, electronic device 100 can capture a preliminary image 320A incorporating the background ROI 460. Electronic device 100 can determine if the background ROI 460 is in focus. In response to determining that the background ROI 460 is not in focus, electronic device 100 can generate and present on display 130 a graphical user interface (GUI) that contains a notification (see FIG. 4B) that the preliminary image 320A is not in focus and a selectable option icon to use the DCSSC mode 338 for completing the self-photo image capture.

Figure 4B:
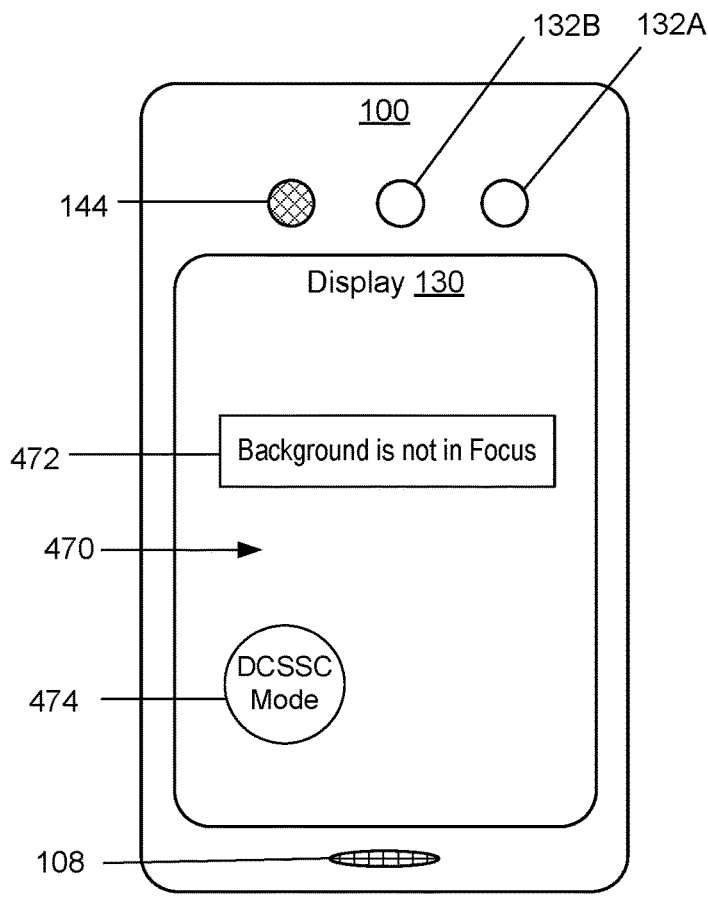
FIG. 4B illustrates content on a display of the electronic device of FIG. 4A, after a preliminary image has been captured, according to one or more embodiments.

With additional reference now to FIG. 4B, electronic device 100 is illustrated with an example GUI 470 presented on display 130 after electronic device 100 has determined that the background ROI 460 is not in focus. GUI 470 presents a notification 472 that the background ROI 460 is not in focus and/or is blurred. GUI 470 can further present a selectable DCSSC mode icon 474 for electronic device user 410 to select to use the DCSSC mode 338 for completing the self-photo image capture.

Figure 5A:
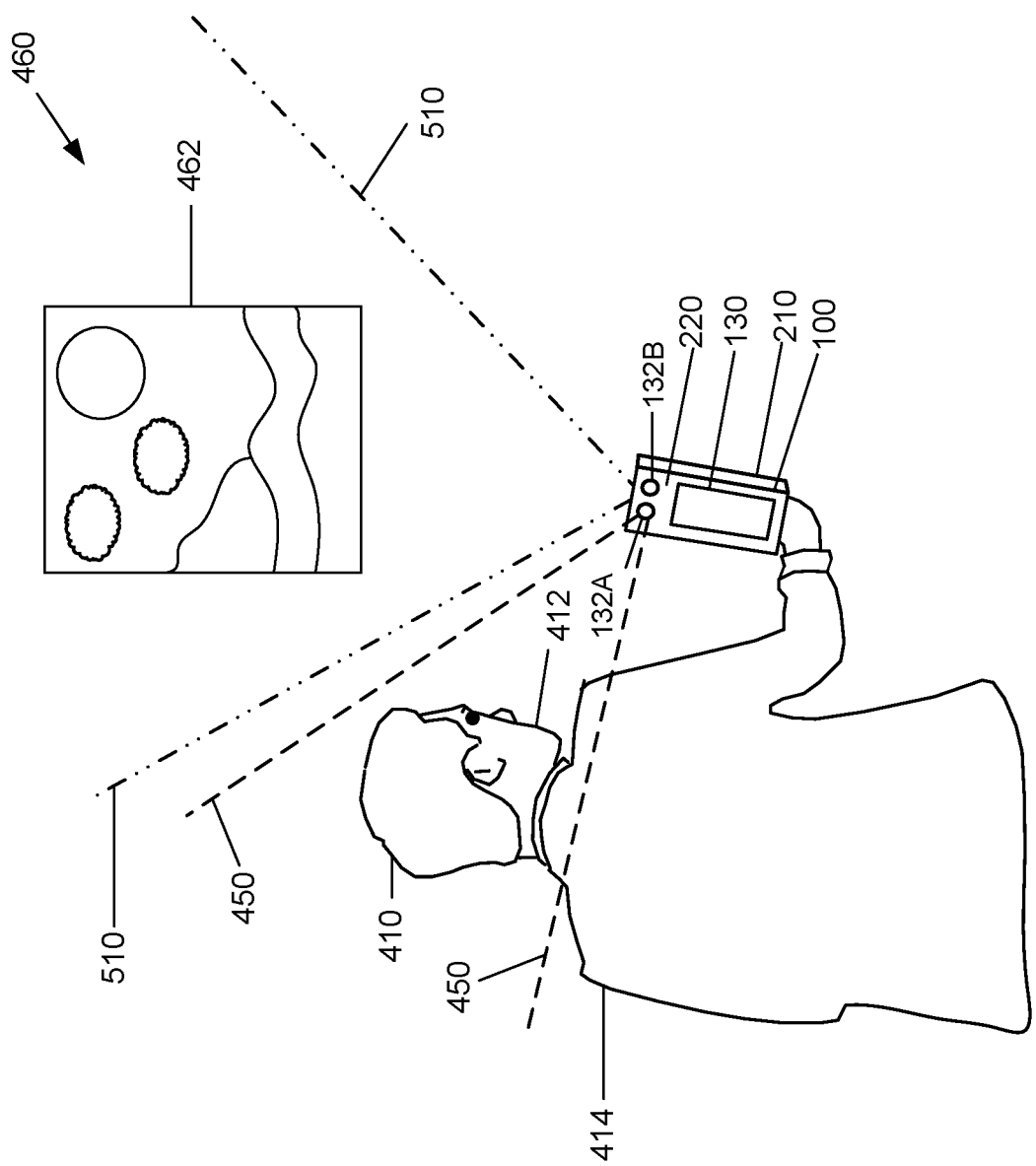
FIG. 5A is an example illustration of an electronic device using a dual camera superimposed selfie capture (DCSSC) mode to complete a self-photo, according to one or more embodiments.

FIG. 5A illustrates electronic device 100 being used after DCSSC mode icon 474 has been selected to activate the DCSSC mode 338 for completing the self-photo image capture. Referring to FIG. 5A, electronic device 100 has been positioned by the electronic device user 410 such that the front cameras 132A-132B face electronic device user 410 and the rear cameras 133A-133C face background ROI 460. Selection of the DCSSC mode 338 enables electronic device 100 to capture a focused image of the background ROI 460 using at least one of the rear cameras 133A-133C and at the same time (i.e., contemporaneously) capture a focused image of the face of the electronic device user 410 using front camera 132A. Front camera 132A has a FOV 450 that captures second image 344A containing the face 412 and a portion of torso 414 of user 410. The active rear camera (i.e., rear camera 133A) has a FOV 510 that captures first image 342A containing background ROI 460 including painting 462.

Figure 5B:
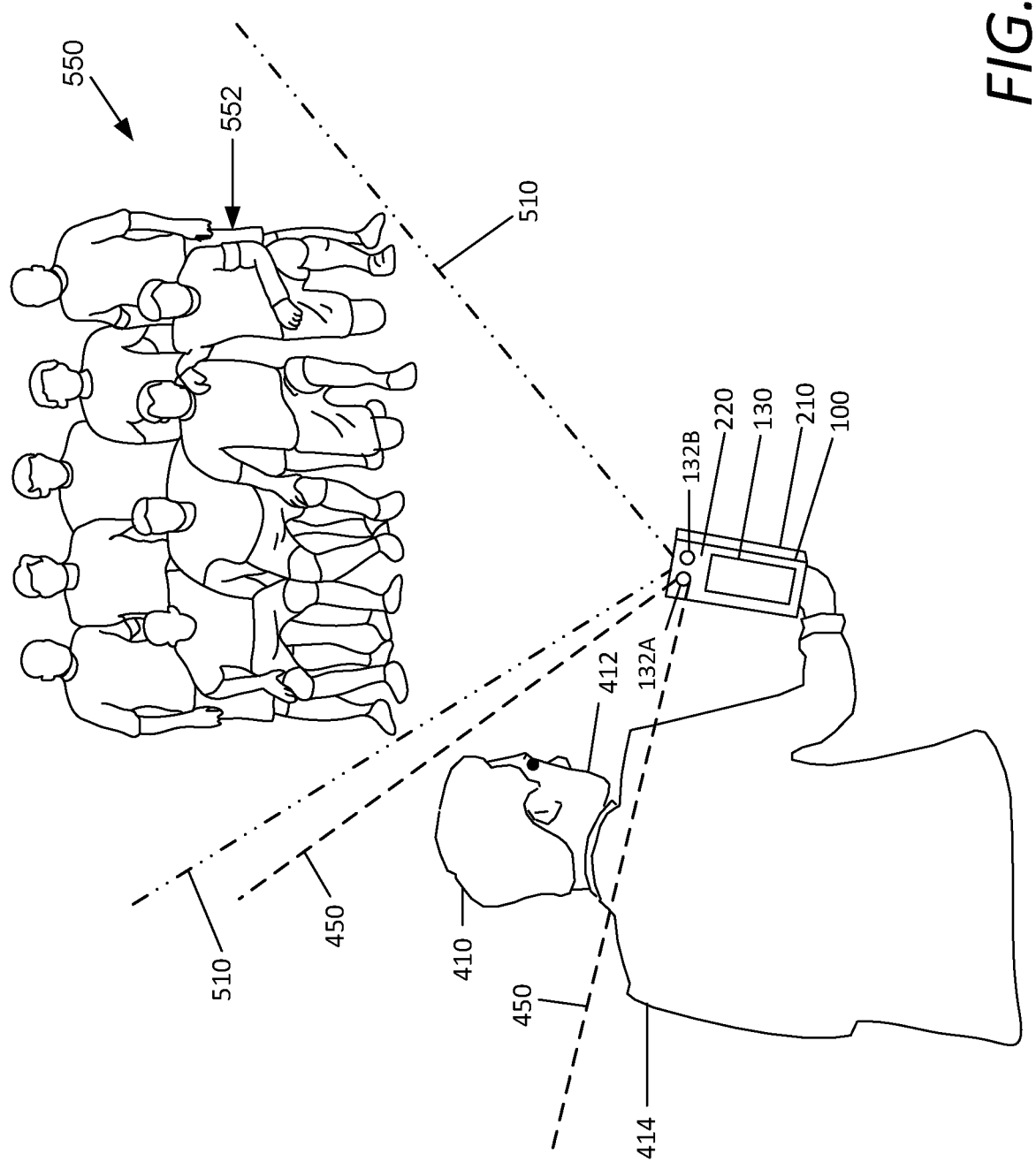
FIG. 5B is an example illustration of an electronic device using a dual camera superimposed selfie capture (DCSSC) mode to complete a group self-photo, according to one or more embodiments.

FIG. 5B illustrates electronic device 100 being used after DCSSC mode icon 474 has been selected to activate the DCSSC mode 338 for completing a group self-photo or group selfie image capture. Referring to FIG. 5B, electronic device 100 has been positioned by the electronic device user 410 such that the front cameras 132A-132B face electronic device user 410 and the rear cameras 133A-133C face background ROI 550 including a group of people 552 within FOV 450. In one embodiment, electronic device user 410 may want to capture a group selfie with group of people 552, such as a sports team. For example, group of people 552 can be a soccer team. According to one aspect of the disclosure, when attempting to capture a group selfie image, the front cameras 132A-132B alone may not be able to capture a focused image of the entire group of people 552. Selection of the DCSSC mode 338 enables electronic device 100 to capture a focused image of the background ROI 550 using at least one of the rear cameras 133A-133C and at the same time (i.e., contemporaneously) capture a focused image of the face of the electronic device user 410 using front camera 132A. Front camera 132A has a FOV 450 that captures second image 344A containing the face 412 and a portion of torso 414 of user 410. The active rear camera (i.e., rear camera 133A) has a FOV 510 that captures first image 342A containing background ROI 550 including group of people 552.

Figure 6B:
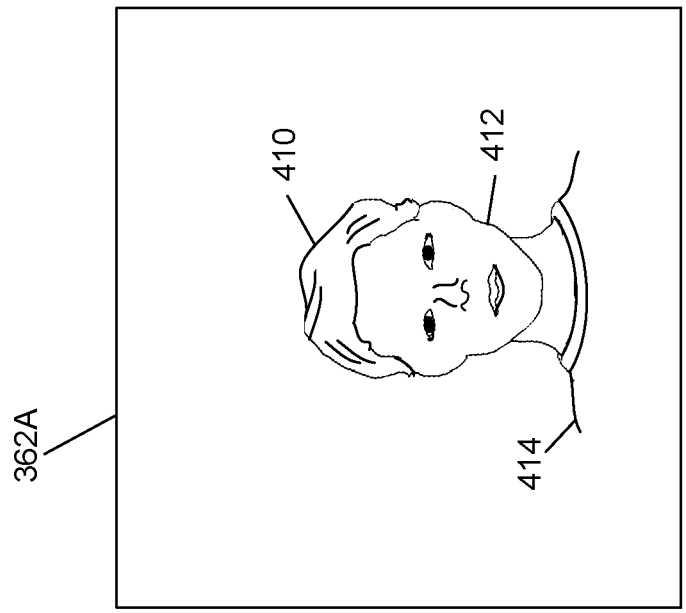
FIG. 6B is an example cropped facial image remaining after the background of the image of FIG. 6A has been removed according to one or more embodiments.
Figure 6A:
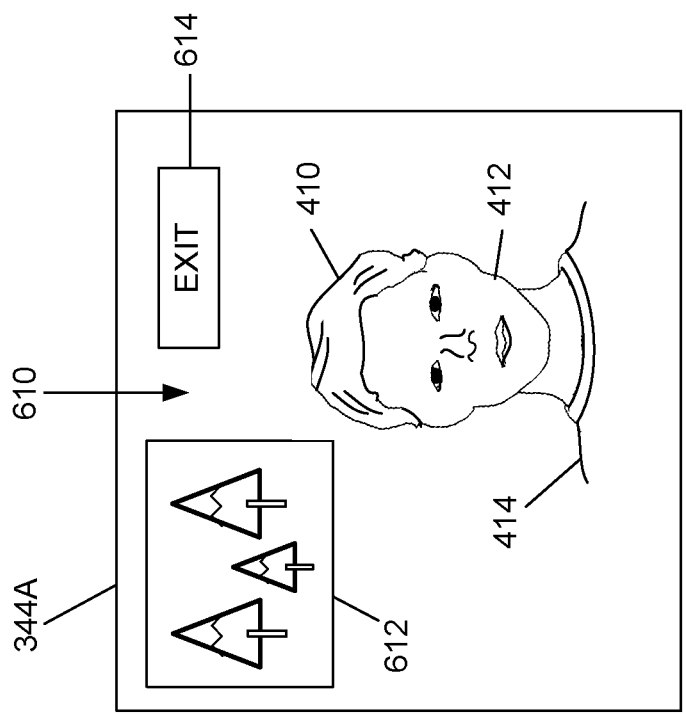
FIG. 6A is an example image captured by a front camera of the electronic device of FIG. 1, including a face of a user and a background, according to one or more embodiments.

With reference now to FIG. 6A, an example second image 344A captured by front camera 132A is illustrated. Second image 344A includes the face 412 and a portion of upper torso 414 of user 410. Second image 344A further includes a background 610 comprising a second painting 612 and an exit sign 614. According to one aspect of the disclosure. CCM 136 enables electronic device 100 to processes the second image 344A through artificial intelligence engine 312, which identifies face 412, a portion of torso 414 and a background 610 in the second image 344A. CCM 136 further enables electronic device 100 to remove the background 610 from the second image 344A to generate facial image 362A based on the remaining face 412 and portion of upper torso 414 after the background 610 has been removed.

Turning to FIG. 6B, an example facial image 362A is illustrated after background 610 has been removed. In FIG. 6B, the background 610 including second painting 612 and exit sign 614 have been removed from second image 344A leaving face 412 and a portion of upper torso 414 remaining in facial image 362A.

Figure 7A:
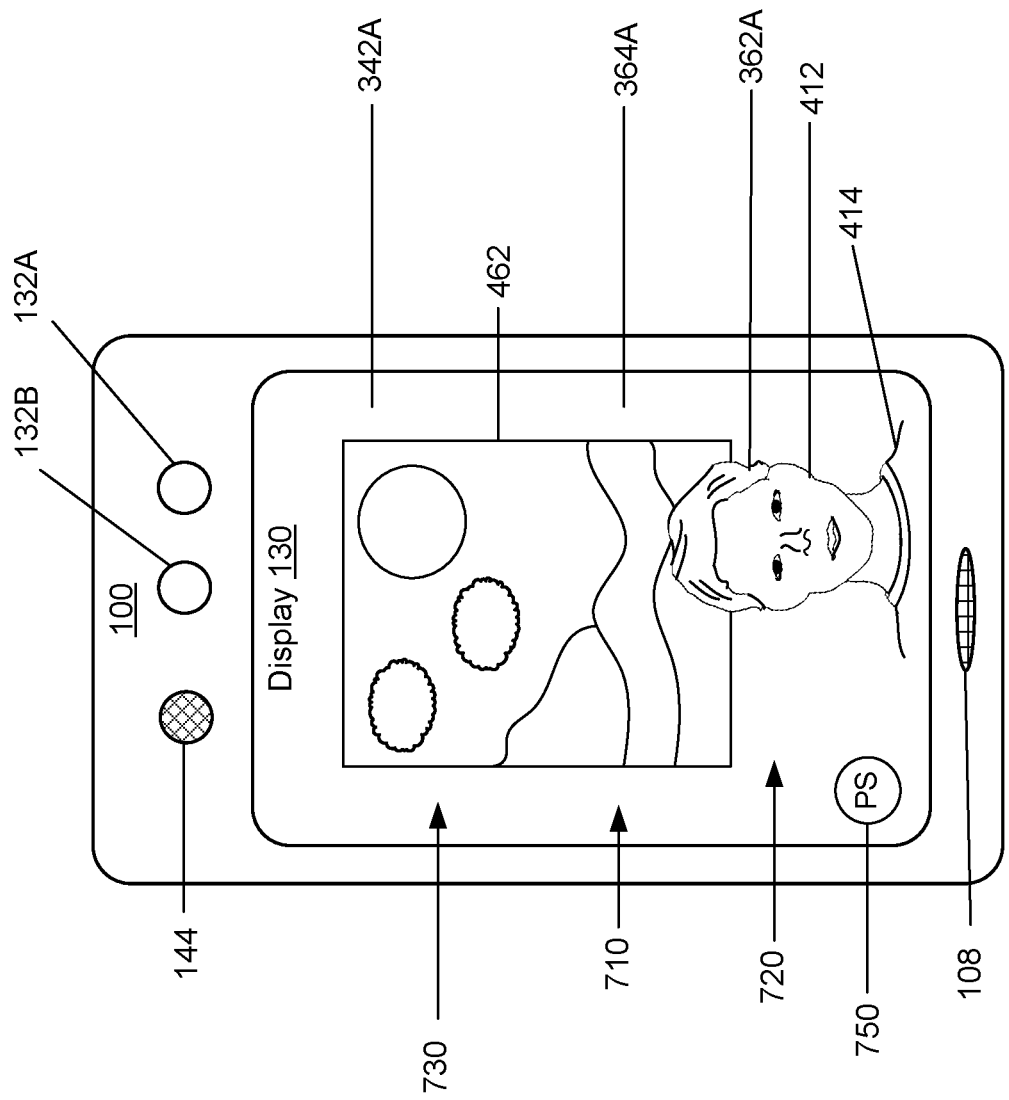
FIG. 7A illustrates content on a display of the electronic device of FIG. 5A, after a facial image has been superimposed onto the image captured by the rear camera to generate a composite image, according to one or more embodiments.

Referring to FIG. 7A, electronic device 100 is illustrated with an example GUI 710 containing first composite image 364A presented on display 130. First composite image 364A is generated by superimposing facial image 362A onto first image 342A of painting 462. First composite image 364A includes first image 342A with the superimposed facial image 362A. Facial image 362A is located in a foreground 720 of first composite image 364A and the first image 342A is located in a background 730 of the first composite image 364A. GUI 710 can further present a selectable position/size adjustment icon 750 for electronic device user 410 to select to re-position and/or re-size the facial image 362A within first composite image 364A.

According to one aspect of the disclosure. CCM 136 enables electronic device 100 to detect the activation, via processor 102, of rear camera 133A to capture a first image 342A incorporating a first region of interest (ROI) 460 within a field of view 510 of the rear camera 133A. In response to detecting selection by a device user of a dual camera superimposed selfie capture (DCSSC) mode 338 for completing the image capture, electronic device 100 captures, via rear camera 133A, the first image 342A that includes the first region of interest 460, and electronic device 100 contemporaneously captures, via front camera 132A, a second image 344A containing at least one face 412. Electronic device 100 further crops a facial image 362A comprising the at least one face 412 from the second image 344A and superimposes the facial image 362A onto the first image 342A to generate a first composite image 364A, which is presented as a self-photo of the user with the first region of interest (or first image) in the background.

According to another aspect of the disclosure, CCM 136 enables electronic device 100 to identify at least one first image characteristic 342B of the first image 342A. The first image characteristics 342B can include, for example, white balance, exposure, light level and light direction. Electronic device 100 generates a modified facial image 362C by adjusting one or more facial image characteristics 362B of the facial image 362A to match the at least one first image characteristics 342B. Electronic device 100 then incorporates the modified facial image 362C into the first composite image 364A.

According to an additional aspect of the disclosure, CCM 136 enables electronic device 100 to display the first composite image 364A on display 130 and generate and present a GUI 710 that contains a selectable position/size adjustment icon 750 within a user interface (i.e., touch screen interface 131) that allows manipulation of the location and/or size of the facial image 362A within first composite image 364A based on input received from an input device or the user interface. In one embodiment, after selecting position/size adjustment icon 750, a user can touch facial image 362A on touch screen interface 131 with a finger and drag the facial image in order to change the position of the facial image 362A within first composite image 364A. In another embodiment, a user can touch facial image 362A on touch screen interface 131 with two fingers and can move both fingers in order to change the size of the facial image 362A within first composite image 364A. Electronic device 100 further determines a first position and/or a first size of the facial image 362A within the first composite image 364A based on the input received from the input device or user interface. Electronic device 100 further generates a second composite image 366A based on the determined first position and/or first size of the facial image 362A and the first composite image 364A and displays the second composite image 366A on display 130.

Figure 7B:
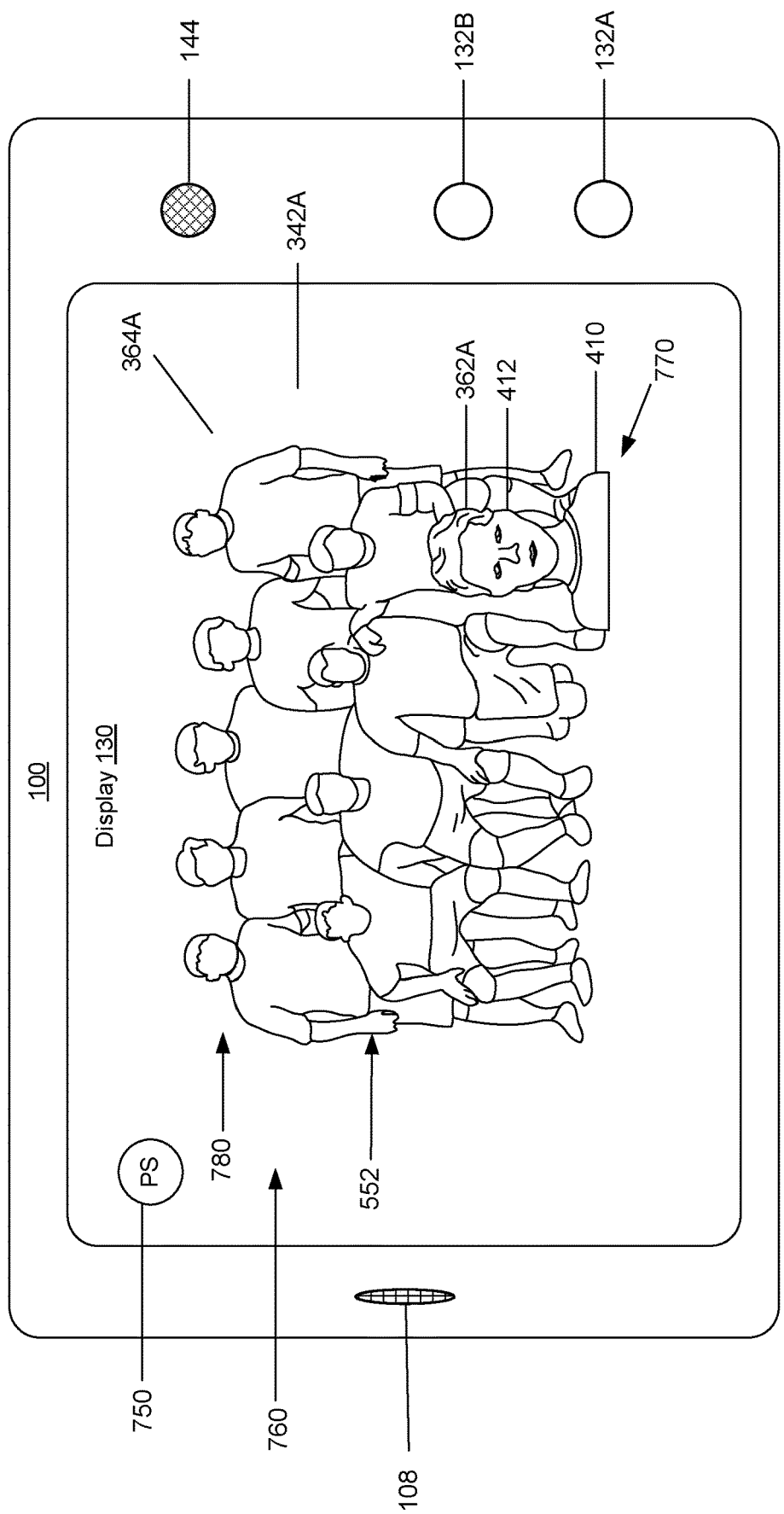
FIG. 7B illustrates content on a display of the electronic device of FIG. 5B, after a facial image has been superimposed onto the image captured by the rear camera to generate a composite group self-photo image, according to one or more embodiments.

Turning to FIG. 7B, electronic device 100 is illustrated with another example GUI 760 containing first composite image 364A presented on display 130. In FIG. 7B, first composite image 364A is shown as a group self-photo or group selfie of electronic device user 410 and group of people 552 as captured in FIG. 5B. First composite image 364A is generated by superimposing facial image 362A onto first image 342A of group of people 552. First composite image 364A includes first image 342A with the superimposed facial image 362A. Facial image 362A is located in a foreground 770 of first composite image 364A and the first image 342A is located in a background 780 of the first composite image 364A. GUI 760 can further present a selectable position/size adjustment icon 750 for electronic device user 410 to select to re-position and/or re-size the facial image 362A within first composite image 364A.

Figure 8:
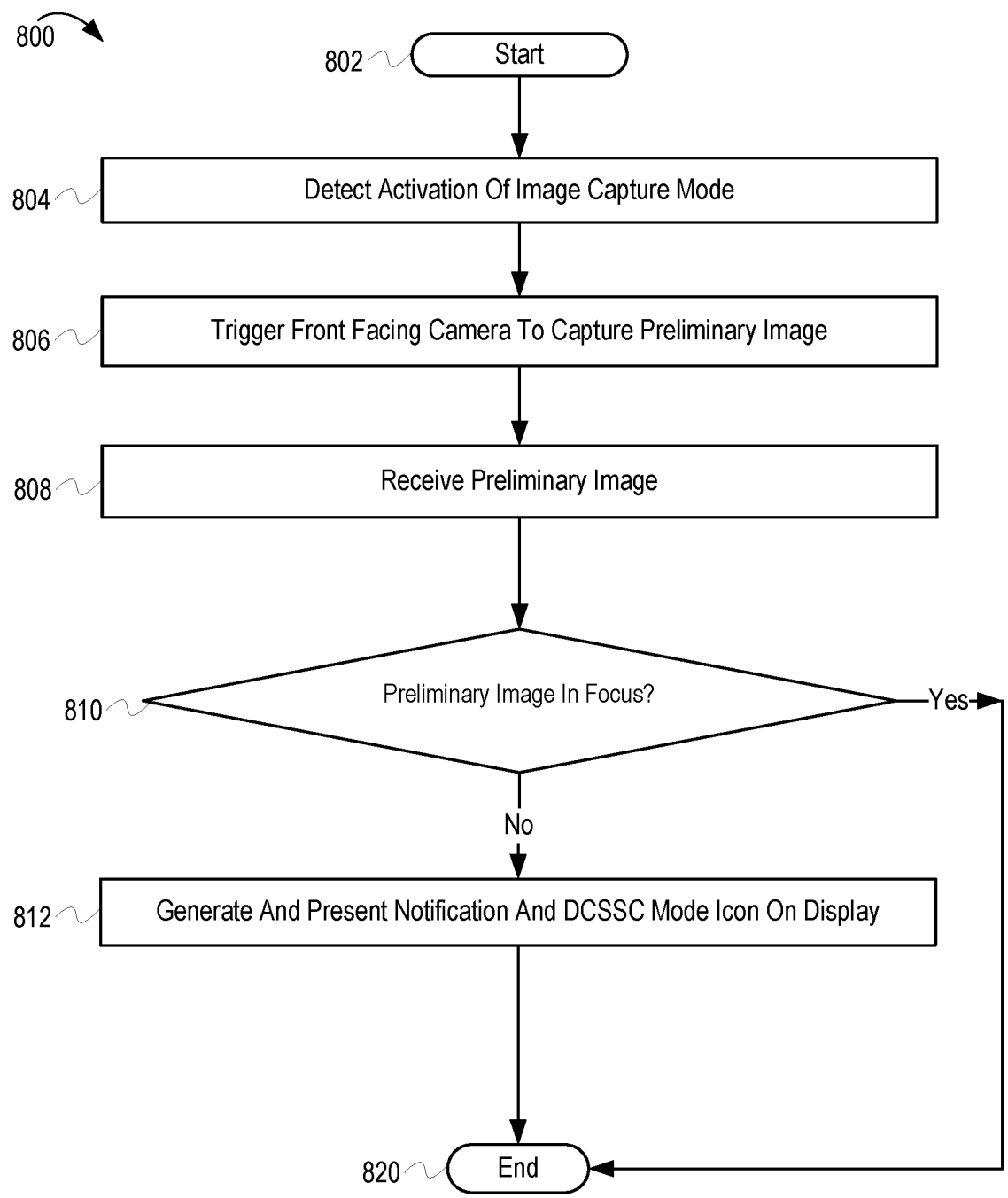
FIG. 8 depicts a flowchart of a method by which an electronic device determines that a preliminary image is not in focus and presents a DCSSC icon for modifying the image, according to one or more embodiments.
Figure 9:
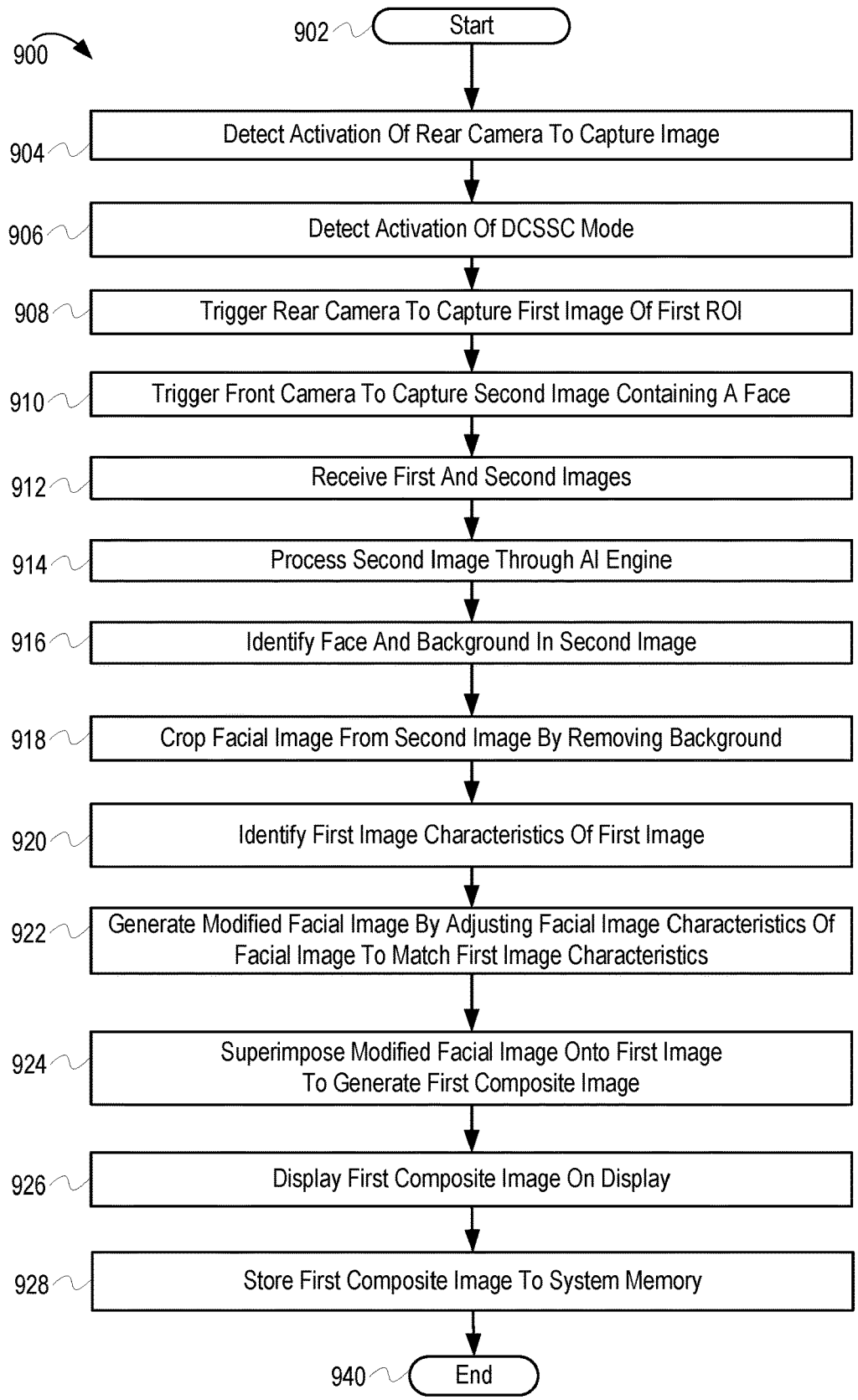
FIG. 9 depicts a flowchart of a method by which an electronic device captures a self-photo using the DCSSC mode to generate a composite image, according to one or more embodiments.
Figure 10:
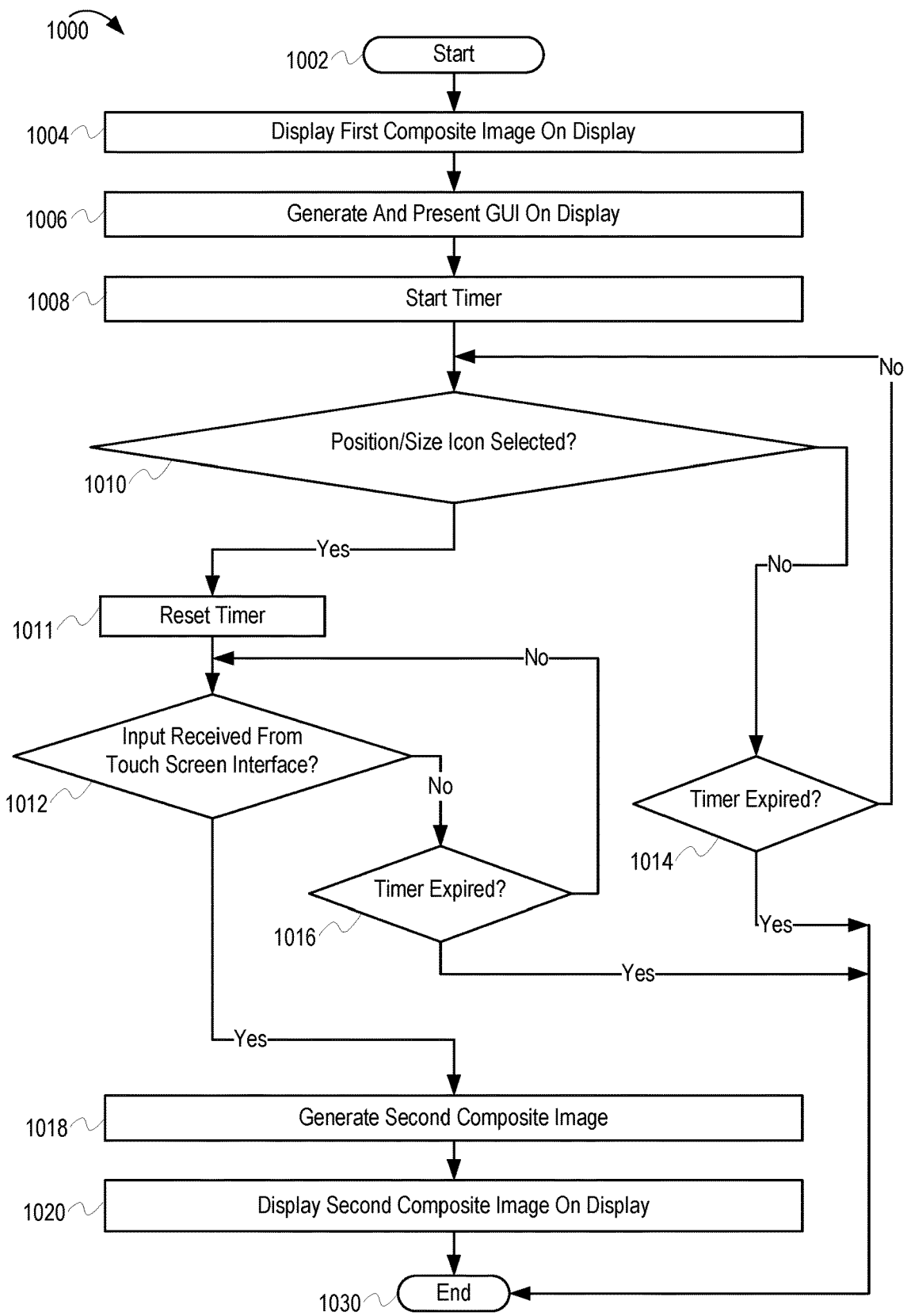
FIG. 10 depicts a flowchart of a method by which an electronic device modifies the location and size of a facial image within a composite image, according to one or more embodiments.

FIG. 8 depicts method 800 by which electronic device 100 determines that a preliminary background image in a self-photo is not in focus and presents a DCSSC icon to use the DCSSC mode for completing the self-photo image capture. FIG. 9 depicts method 900 by which electronic device 100 captures a self-photo using the DCSSC mode to generate a composite image. FIG. 10 depicts method 1000 by which electronic device 100 enables and provides modification of the location and size of a facial image within a composite image captured via DCSSC mode. The description of methods 800, 900, and 1000 will be described with reference to the components and examples of FIGS. 1-7B.

The operations depicted in FIGS. 8, 9, and 10 can be performed by electronic device 100 or any suitable electronic device that includes front and rear cameras and the one or more functional components of electronic device 100 that provide/enable the described features. One or more of the processes of the methods described in FIGS. 8, 9, and 10 may be performed by processor 102 executing program code associated with CCM 136, and AI engine 312.

With specific reference to FIG. 8, method 800 begins at the start block 802. At block 804, processor 102 detects activation of the single image capture mode 332 for front camera 132A to capture a self-photo. Processor 102 triggers front camera 132A to capture a preliminary image 320A that incorporates background ROI 460 (block 806), and processor 102 receives the preliminary image 320A (block 808). Processor 102 determines if the background ROI 460 is in focus (decision block 810). In response to determining that the background ROI 460 is in focus, method 800 ends at end block 820. In response to determining that the background ROI 460 is not in focus, processor 102 generates and presents on display 130 a GUI 470 that contains a notification 472 that the preliminary image 320A is not in focus and presents a selectable DCSSC mode icon 474, for the user to select, to use DCSSC mode 338 for completing the self-photo image capture (block 812). Method 800 terminates at end block 820.

Referring to FIG. 9, there is presented method 900 by which electronic device 100 captures a self-photo and generates a composite image with a desired object or subject in the background using the DCSSC mode. Method 900 begins at the start block 902. At block 904, processor 102 detects the activation of rear camera 133A and single image capture mode 332 to capture a first image 342A incorporating a first ROI 460 within a field of view 510 of the rear camera 133A. Processor 102 detects the selection, by electronic device user 410, of DCSSC mode 338 for completing the self-photo image capture (block 906). Processor 102 triggers rear camera 133A to capture the first image 342A that includes the first ROI 460 (block 908). Processor 102 contemporaneously triggers front camera 132A to capture the second image 344A containing at least one face 412 (block 910). Processor 102 receives the first image 342A from rear camera 133A and the second image 344A from the front camera 132A (block 912).

Processor 102 processes the second image 344A through artificial intelligence engine 312 (block 914), which identifies face 412, a portion of torso 414 and a background 610 in the second image 344A (block 916). Processor 102 crops a facial image 362A from the second image 344A by removing the background 610 from the second image 344A. The facial image 362A comprises the remaining face 412 and portion of torso 414 after the background 610 has been removed (block 918).

Processor 102 identifies at least one first image characteristic 342B of the first image 342A (block 920). The image characteristics can include, for example, white balance, exposure, light level and light direction. Processor 102 generates a modified facial image 362C by adjusting one or more facial image characteristics 362B of the facial image 362A to match the at least one first image characteristics 342B (block 922).

Processor 102 superimposes the modified facial image 362C onto the first image 342A to generate a first composite image 364A (block 924). Processor 102 displays the first composite image 364A on display 130 (block 926) and stores the first composite image 364A to system memory 120 (block 928). Method 900 terminates at end block 940.

In one embodiment, processor 102 can use scene based segmentation analysis to adjust the facial image characteristics 362B of the facial image 362A to match the image characteristics 342B of first image 342A captured by the rear facing camera 133A. In one example embodiment, the brightness and light direction of the facial image 362A can be adjusted to match the brightness and light direction of first image 342A such that the modified facial image 362C with the face of an electronic device user appears smoothly blended into or merged with the first image 342A within the composite image 364A. The resulting first composite image 364A, when viewed, appears to be a single image that was captured by a single camera as a selfie with harmonized image characteristics, and not two separate images.

Referring to FIG. 10, there is presented method 1000 by which electronic device 100 modifies the location and size of a facial image within a composite image. Method 1000 begins at the start block 1002. At block 1004, processor 102 displays the first composite image 364A on display 130. Processor 102 generates and presents a GUI that contains a selectable position/size adjustment icon 750 and an input device interface (i.e., touch screen interface 131) that allows manipulation of the location and/or size of the facial image 362A within first composite image 364A based on input received from the touch screen interface 131 (block 1006).

Processor 102 starts timer 318 (block 1008). Processor 102 determines if user 410 has provided user input by selecting position/size adjustment icon 750 using an input device such as touch screen interface 131 (decision block 1010). In one embodiment, timer 318 can be set for 10 seconds. In response to determining that user 410 has not selected position/size adjustment icon 750, processor 102 checks if timer 318 has expired (decision block 1014). In response to determining that timer 318 has expired, method 1000 ends at end block 1030. In response to determining that timer 318 has not expired, processor 102 continues to determine if user 410 has provided user input by selecting position/size adjustment icon 750 at decision block 1010.

In response to determining that user 410 has selected position/size icon 750, processor 102 resets timer 318 (block 1011). Processor 102 determines if user 410 has provided user input by re-positioning and/or re-sizing facial image 362A using various types of input device interfaces such as touch screen interface 131 (decision block 1012). In response to determining that user 410 has not provided user input using touch screen interface 131, processor 102 checks if timer 318 has expired (decision block 1016). In response to determining that timer 318 has expired, method 1000 ends at end block 1030. In response to determining that timer 318 has not expired, processor 102 continues to determine if user 410 has provided user input by re-positioning and/or re-sizing facial image 362A at decision block 1012.

In response to determining that user 410 has provided user input by re-positioning and/or re-sizing facial image 362A using touch screen interface 131, processor 102 generates a second composite image 366A based on the re-positioned and/or re-sized facial image 362A and the first composite image 364A (block 1018). In one embodiment, a user can touch facial image 362A on touch screen interface 131 with a finger and drag the facial image in order to change the position of the facial image 362A within first composite image 364A. In another embodiment, a user can touch facial image 362A on touch screen interface 131 with two fingers and can move both fingers in order to change the size of the facial image 362A within first composite image 364A. Processor 102 displays the second composite image 366A on display 130 (block 1020). Method 1000 terminates at end block 1030.

In the above-described methods of FIGS. 8-10, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:
a housing having a first surface and a second surface opposed to the first surface;
at least one display;
at least one input device;
a first camera disposed at the first surface and a second camera disposed at the second surface;
a memory having stored thereon a camera control module (CCM) for controlling image capturing via the first camera and the second camera; and
at least one processor communicatively coupled to the at least one display, the at least one input device, each of the first camera and the second camera, and to the memory, the at least one processor executing program code of the CCM, which enables the electronic device to:
detect activation of the first camera to capture a first image incorporating a first region of interest (ROI) within a field of view of the first camera;
in response to detecting selection of a dual camera superimposed selfie capture (DCSSC) mode for completing the image capture:
capture, via the first camera, the first image that includes the first region of interest;
contemporaneously capture, via the second camera, a second image containing at least one face;
crop a facial image comprising the at least one face from the second image;
superimpose the facial image onto the first image to generate a first composite image;
display the first composite image of the facial image and the first image on the display;

generate and present on the display a first interface that allows manipulation of a location of the facial image from an initial position within the first composite image to a first position, based on input received via the at least one input device;

receive first input from the at least one input device to re-position the facial image to the first position; and based on receipt of the first input: generate a second composite image based on the first position of the facial image; and display the second composite image on the display.

2. The electronic device of claim 1, wherein the facial image comprises an upper torso and the at least one face of a user of the electronic device capturing the first image and the first composite image is a composite selfie image.

3. The electronic device of claim 1, wherein:
the first surface is a rear surface and the first camera is one of at least one rear camera disposed at the rear surface; and
the second surface is a front surface and the second camera is one of at least one front camera disposed at the front surface.

4. The electronic device of claim 1, wherein the at least one processor enables the electronic device to:
identify at least one first image characteristic of the first image;
generate a modified facial image by adjusting one or more second image characteristics of the facial image to match the at least one first image characteristic; and
incorporate the modified facial image into the first composite image.

5. The electronic device of claim 1, wherein the at least one processor enables the electronic device to:
display the first composite image of the facial image and the first image on the display;
generate and present on the display a a second interface that allows manipulation of a size of the facial image based on input received from the at least one input device;
receives second input from the at least one input device;
determine a first size of the facial image based on the second input received;
generate a second composite image based on the determined first size of the facial image and the first image; and
display the second composite image on the display.

6. The electronic device of claim 1, wherein the facial image is located in a foreground of the first composite image and the first image is located in a background of the first composite image.

7. The electronic device of claim 1, wherein to crop the facial image from the second image, the at least one processor enables the electronic device to:
process the second image through an artificial intelligence engine, which identifies the at least one face and a background in the second image; and
remove the background from the second image to generate the facial image based on the remaining at least one face after the background has been removed.

8. The electronic device of claim 1, wherein the at least one processor enables the electronic device to:
in response to detecting activation of the second camera to capture a third image;
determine if the third image is in focus;
in response to determining that the third image is not in focus:
present on the display a graphical user interface (GUI) that contains a notification that the third image is not in focus and a selectable option to use the DCSSC mode for completing the image capture; and
activate the DCSSC mode in response to a selection of the selectable option, the DCSSC mode enabling the electronic device to generate a composite image comprising a facial image cropped from the third image superimposed on a first image captured by one of the at least one rear camera.

9. A method comprising:
detecting, via at least one processor, activation of a first camera of an electronic device to capture a first image incorporating a first region of interest (ROI) within a field of view of the first camera;
in response to detecting selection of a dual camera superimposed selfie capture (DCSSC) mode for completing the image capture:
capturing, via the first camera, the first image that includes the first region of interest;
contemporaneously capturing, via a second camera, a second image containing at least one face;
cropping a facial image comprising the at least one face from the second image;
superimposing the facial image onto the first image to generate a first composite image;
displaying the first composite image of the facial image and the first image on the display;
generating and presenting on the display a first interface that allows manipulation of a location of the facial image from an initial position within the first composite image to a first position, based on input received via the at least one input device;
receiving first input from the at least one input device to re-position the facial image to the first position; and
based on receipt of the first input: generating a second composite image based on the first position of the facial image; and display the second composite image on the display.

10. The method of claim 9, wherein the facial image comprises an upper torso and the at least one face of a user of the electronic device capturing the first image and the first composite image is a composite selfie image.

11. The method of claim 9, wherein the electronic device further comprises:
a rear surface and the first camera is one of at least one rear camera disposed at the rear surface; and
a front surface and the second camera is one of at least one front camera disposed at the front surface.

12. The method of claim 9, further comprising:
identifying at least one first image characteristic of the first image;
generating a modified facial image by adjusting one or more second image characteristics of the facial image to match the at least one first image characteristic; and
incorporating the modified facial image into the first composite image.

13. The method of claim 9, further comprising:
displaying the first composite image of the facial image and the first image on a display;
generating and presenting on the display a second interface that allows manipulation of a size of the facial image based on input received from at least one input device;
receiving first input from the at least one input device;

determining a first size of the facial image based on the first input received;
generating a second composite image based on the determined first size of the facial image and the first image; and
displaying the second composite image on the display.

14. The method of claim 9, wherein the facial image is located in a foreground of the first composite image and the first image is located in a background of the first composite image.

15. The method of claim 9, wherein to crop the facial image from the second image, the method further comprises:
processing the second image through an artificial intelligence engine, which identifies the at least one face and a background in the second image; and
removing the background from the second image to generate the facial image based on the remaining at least one face after the background has been removed.

16. The method of claim 9, further comprising:
in response to detecting activation of the second camera to capture a third image;
determining if the third image is in focus;
in response to determining that the third image is not in focus:
presenting on a display a graphical user interface (GUI) that contains a notification that the third image is not in focus and a selectable option to use the DCSSC mode for completing the image capture; and
activating the DCSSC mode in response to a selection of the selectable option, the DCSSC mode enabling the electronic device to generate a composite image comprising a facial image cropped from the third image superimposed on a first image captured by one of the at least one rear camera.

17. A computer program product comprising:
a non-transitory computer readable storage device having stored thereon program code which, when executed by at least one processor of an electronic device having a display, a first camera, a second camera and a memory, enables the electronic device to complete the functionality of:
detecting activation of the first camera to capture a first image incorporating a first region of interest (ROI) within a field of view of the first camera;
in response to detecting selection of a dual camera superimposed selfie capture (DCSSC) mode for completing the image capture:
capturing, via the first camera, the first image that includes the first region of interest;
contemporaneously capturing, via the second camera, a second image containing at least one face;
cropping a facial image comprising the at least one face from the second image;
superimposing the facial image onto the first image to generate a first composite image;
displaying the first composite image of the facial image and the first image on the display;
generating and presenting on the display a first interface that allows manipulation of a location of the facial image from an initial position within the first composite image to a first position, based on input received via the at least one input device;
receiving first input from the at least one input device to re-position the facial image to the first position; and
based on receipt of the first input: generating a second composite image based on the first position of the facial image; and display the second composite image on the display.

18. The computer program product of claim 17, wherein the program code for controlling image capturing comprises program code that further enables the electronic device to complete the functionality of:
identifying at least one first image characteristic of the first image;
generating a modified facial image by adjusting one or more second image characteristics of the facial image to match the at least one first image characteristic; and
incorporating the modified facial image into the first composite image.

19. The computer program product of claim 17, wherein the program code further enables the electronic device to complete the functionality of:
displaying the first composite image of the facial image and the first image on a display;
generating and presenting on the display a first interface that allows manipulation of a size of the facial image based on input received from at least one input device;
receiving second input from the at least one input device;
determining a first size of the facial image based on the second input received;
generating a second composite image based on the determined first size of the facial image and the first image; and
displaying the second composite image on the display.

20. The computer program product of claim 17, wherein the program code further enables the electronic device to complete the functionality of:
in response to detecting activation of the second camera to capture a third image;
determining if the third image is in focus;
in response to determining that the third image is not in focus:
presenting on a display a graphical user interface (GUI) that contains a notification that the third image is not in focus and a selectable option to use the DCSSC mode for completing the image capture; and
activating the DCSSC mode in response to a selection of the selectable option, the DCSSC mode enabling the electronic device to generate a composite image comprising a facial image cropped from the third image superimposed on a first image captured by one of the at least one rear camera.

* * * * *